US010559046B2

(12) United States Patent
Hirata et al.

(10) Patent No.: US 10,559,046 B2
(45) Date of Patent: Feb. 11, 2020

(54) POWER SUPPLY MANAGEMENT SYSTEM

(71) Applicant: TOYOTA JIDOSHA KABUSHIKI KAISHA, Toyota-shi, Aichi-ken (JP)

(72) Inventors: Tetsuya Hirata, Nagoya (JP); Masayuki Kawamoto, Toyota (JP); Jun Koreishi, Toyota (JP); Tatsuya Morii, Nagoya (JP); Koshi Ito, Okazaki (JP); Kengo Matsunaga, Toyota (JP); Takahiro Yamada, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 285 days.

(21) Appl. No.: 15/521,171

(22) PCT Filed: Oct. 7, 2015

(86) PCT No.: PCT/JP2015/078524
§ 371 (c)(1),
(2) Date: Apr. 21, 2017

(87) PCT Pub. No.: WO2016/063734
PCT Pub. Date: Apr. 28, 2016

(65) Prior Publication Data
US 2017/0345107 A1 Nov. 30, 2017

(30) Foreign Application Priority Data
Oct. 23, 2014 (JP) .................................. 2014-216533

(51) Int. Cl.
*G06Q 50/06* (2012.01)
*H02J 7/35* (2006.01)
(Continued)

(52) U.S. Cl.
CPC ............. *G06Q 50/06* (2013.01); *G05B 15/02* (2013.01); *G06Q 30/04* (2013.01); *H02J 3/14* (2013.01);
(Continued)

(58) Field of Classification Search
CPC ........ G06Q 50/06; G06Q 30/04; G05B 15/02; H02J 3/14; H02J 3/383
See application file for complete search history.

(56) References Cited

U.S. PATENT DOCUMENTS 6,673,479 B2 * 1/2004 McArthur ........... B60L 15/2045
429/513
8,509,957 B2 * 8/2013 Tsuchiya ................... H02J 3/32
700/286
(Continued)

FOREIGN PATENT DOCUMENTS

JP 2002-230101 A 8/2002
JP 2007-101323 A 4/2007
(Continued)

OTHER PUBLICATIONS

Keiji Aramaki, Kitakyushu Smart Community Creation Project, Information Processing Society of Japan Digital Practice, Jul. 15, 2014 (Jul. 15, 2014), vol. 5, No. 3, pp. 180 to 188, (cited in ISR).

*Primary Examiner* — Fahd A Obeid
*Assistant Examiner* — Michael Jared Walker
(74) *Attorney, Agent, or Firm* — Hunton Andrews Kurth LLP

(57) ABSTRACT

A power supply management system according to an embodiment of the present invention includes a fee setting unit configured to set power fee unit prices (first power fee unit price and second power fee unit price) for each time slot, and a notification unit configured to notify a consumer of information on the set power fee unit prices. The first power fee unit price is a power unit price for a household
(Continued)

electrical load, and the second power fee unit price is a power unit price in a case of using a charge/discharge device to charge a vehicle-mounted storage battery. The fee setting unit is configured to set, by predicting a load factor of a transformer, a discount rate of the second power fee unit price to become higher (second power fee unit price to become lower) as the predicted load factor becomes lower. The second power fee unit price is determined on the basis of the first power fee unit price and the discount rate.

12 Claims, 6 Drawing Sheets

(51) Int. Cl.
    *G05B 15/02*     (2006.01)
    *G06Q 30/04*     (2012.01)
    *H02J 3/14*     (2006.01)
    *H02J 3/38*     (2006.01)
    *H02J 3/00*     (2006.01)

(52) U.S. Cl.
    CPC ............ *H02J 3/383* (2013.01); *H02J 7/35* (2013.01); *H02J 2003/003* (2013.01); *H02J 2003/143* (2013.01)

(56) References Cited

U.S. PATENT DOCUMENTS

| | | | | |
|---|---|---|---|---|
| 9,276,411 B2* | 3/2016 | Tominaga | ................. | H02J 3/14 |
| 9,293,915 B2* | 3/2016 | Baba | ..................... | H02J 3/008 |
| 2012/0233060 A1* | 9/2012 | Terano | ................. | G06Q 30/06 |
| | | | | 705/37 |
| 2012/0242150 A1* | 9/2012 | Ukai | ........................ | H02J 3/32 |
| | | | | 307/64 |
| 2013/0006831 A1* | 1/2013 | Mise | ..................... | G06Q 10/06 |
| | | | | 705/37 |
| 2013/0024035 A1* | 1/2013 | Ito | ......................... | B60L 53/51 |
| | | | | 700/291 |
| 2013/0049695 A1* | 2/2013 | Baba | ....................... | H02J 3/32 |
| | | | | 320/128 |
| 2013/0131876 A1* | 5/2013 | Lee | ......................... | H04L 12/10 |
| | | | | 700/286 |
| 2013/0270911 A1* | 10/2013 | Baba | ........................ | H02J 7/34 |
| | | | | 307/65 |
| 2013/0311000 A1* | 11/2013 | Kudo | ..................... | H02J 3/46 |
| | | | | 700/296 |
| 2013/0311236 A1* | 11/2013 | Takahashi | ............. | G06Q 10/06 |
| | | | | 705/7.31 |

FOREIGN PATENT DOCUMENTS

| | | |
|---|---|---|
| JP | 2010-279160 A | 12/2010 |
| JP | 4990514 B2 | 8/2012 |
| JP | 2012-210132 A | 10/2012 |

* cited by examiner (A)

(B)

| TIME FRAME | TIME | TOTAL AMOUNT OF POWER CONSUMPTION (PREDICTED VALUE) |
|---|---|---|
| 42 | 21:00 | 4.90 |
| 43 | 21:30 | 7.22 |
| 44 | 22:00 | 4.93 |
| 45 | 22:30 | 4.31 |
| 46 | 23:00 | 4.07 |
| 47 | 23:30 | 4.12 |
| 0 | 0:00 | 9.91 |
| 1 | 0:30 | 10.69 |
| 2 | 1:00 | 13.03 |
| 3 | 1:30 | 15.22 |
| 4 | 2:00 | 16.88 |
| 5 | 2:30 | 16.42 |
| 6 | 3:00 | 17.62 |
| 7 | 3:30 | 17.08 |
| 8 | 4:00 | 17.92 |
| 9 | 4:30 | 18.00 |
| 10 | 5:00 | 19.68 |
| 11 | 5:30 | 20.79 |
| 12 | 6:00 | 19.16 |
| 13 | 6:30 | 18.69 |
| 14 | 7:00 | 13.06 |
| 15 | 7:30 | 6.72 |
| 16 | 8:00 | 4.21 |
| 17 | 8:30 | 1.97 |
| 18 | 9:00 | 1.42 |
| 19 | 9:30 | 1.16 |
| 20 | 10:00 | 0.86 |
| 21 | 10:30 | 0.84 |
| 22 | 11:00 | 0.99 |
| 23 | 11:30 | 0.74 |
| 24 | 12:00 | 0.69 |
| 25 | 12:30 | 0.24 |
| 26 | 13:00 | 0.33 |
| 27 | 13:30 | 0.27 |
| 28 | 14:00 | 0.28 |
| 29 | 14:30 | 0.15 |
| 30 | 15:00 | 0.41 |
| 31 | 15:30 | 0.33 |
| 32 | 16:00 | 1.35 |
| 33 | 16:30 | 3.62 |
| 34 | 17:00 | 4.39 |
| 35 | 17:30 | 2.56 |
| 36 | 18:00 | 3.20 |
| 37 | 18:30 | 2.65 |
| 38 | 19:00 | 2.23 |
| 39 | 19:30 | 3.22 |
| 40 | 20:00 | 3.88 |
| 41 | 20:30 | 2.90 |

FIG.6

POWER SUPPLY MANAGEMENT SYSTEM

CROSS-REFERENCE TO RELATED APPLICATIONS

This is a national phase application based on the PCT International Patent Application No. PCT/JP2015/078524 filed Oct. 7, 2015, claiming priority to Japanese Patent Application No. 2014-216533 filed Oct. 23, 2014, the entire contents of both of which are incorporated herein by reference.

TECHNICAL FIELD

The present invention relates to a power supply management system, which is capable of providing information on at least an electricity fee to a consumer of electric power.

BACKGROUND ART

There has been known, as the related art, an apparatus configured to receive information on an electricity fee (power fee unit price) for each time slot from the outside, and to notify a consumer (user) of the received information on the electricity fee for each time slot (see, for example, Patent Literature 1).

In general, in order to level a proportion of an amount of power consumption (amount of demand power) to an amount of generated power (amount of suppliable power), an electricity fee is set at a low fee in a time slot in which the amount of power consumption is small with respect to the amount of generated power (that is, time slot with a sufficient amount of suppliable power). Further, the consumer generally tends to behave so as to use an electrical load device in a time slot with the low electricity fee, and so as to refrain from using the electrical load device in a time slot with a high electricity fee. Therefore, according to the above-mentioned related-art apparatus, the power consumption behavior of the consumer may be guided appropriately, and hence the amount of power consumption is expected to be leveled so that the amount of power consumption does not exceed the amount of generated power.

CITATION LIST

Patent Literature

[PTL 1] JP 2012-210132 A

SUMMARY OF INVENTION

In a residence of the consumer, there are household electrical loads with relatively low power consumption, such as household appliances (a television, a microwave oven, an air conditioner, lights, and the like). Further, in the residence of the consumer, there is often a load (hereinafter also referred to as "high power consumption load") with extremely high power consumption as compared to the household electrical loads, for example, a charge/discharge device configured to charge a vehicle-mounted storage battery of a plug-in hybrid vehicle or electric vehicle, etc. (hereinafter referred to as "PHV/EV etc."). Therefore, when the consumer charges the vehicle-mounted storage battery, for example, in the time slot with the low electricity fee, a large amount of power consumption may be shifted from a time slot with the large amount of power consumption to a time slot with the small amount of power consumption, and hence the amount of power consumption may be leveled more reliably.

However, it is often the case that a time slot in which the consumer uses the high power consumption load, for example, the PHV/EV etc. (for example, a time slot in which the vehicle is used) is fixed according to the lifestyle of the consumer to a certain extent. In other words, the time slot in which the high power consumption load is used (for example, the time slot in which the vehicle-mounted storage battery is charged in the residence of the consumer) is often restricted. Therefore, when the consumer is notified of the information on the electricity fee for each time slot as in the above-mentioned related-art apparatus, the possibility that the consumer will behave so as to actively use the household electrical loads in the time slot with the low electricity fee is increased, but the possibility that the user will behave so as to actively charge the vehicle-mounted storage battery (that is, actively use the high power consumption load) is not much increased. As a result, there is a problem that it is not easy to more appropriately level the amount of power consumption.

The present invention has been made to address the above-mentioned problem. Specifically, it is an object of the present invention to provide a power supply management system, which is capable of suitably guiding a consumer's behavior regarding power consumption, and hence of achieving leveling of the amount of power consumption with a higher probability.

In order to achieve the above-mentioned object, "the power supply management system according to the present invention (hereinafter also simply referred to as "the system of the present invention")" is a system configured to supply electric power from a power supply system to a first electrical load device and a second electrical load device, both of which are used in a residence of a consumer. The first electrical load device has power consumption of a first value. The second electrical load device has power consumption of a second value, which is different from the first value. Therefore, an amount of power consumption of the first electrical load device is different from an amount of power consumption of the second electrical load device.

Further, the system of the present invention includes:

a fee setting unit configured to set a power fee unit price for each time slot; and a notification unit configured to notify the consumer of information on the set power fee unit price.

In addition, the fee setting unit is configured to set a first power fee unit price, which is a power fee unit price for the first electrical load device, and a second power fee unit price, which is a power fee unit price for the second electrical load device, in such a manner that the first power fee unit price and the second power fee unit price are different from each other.

Therefore, according to the system of the present invention, the consumer can be prompted/urged to perform the power consumption behavior of using the first electrical load device and the power consumption behavior of using the second electrical load device individually. As a result, a part of an amount of power consumption in one time slot can be easily shifted to another time slot, and hence the leveling of the amount of power consumption can be achieved with a higher probability.

In one aspect of the system of the present invention:

the second value is larger than the first value (that is, the power consumption of the second electrical load device is higher than the power consumption of the first electrical load device); and the fee setting unit is configured to set the second power fee unit price at a value that is lower than the first power fee unit price.

With this configuration, the power consumption behavior of the consumer can be easily guided so that the second electrical load device having the power consumption that is higher than that of the first electrical load device is used in a desired time slot. As a result, a part of an amount of power consumption in one time slot can be shifted to another time slot more reliably, and hence the leveling of the amount of power consumption can be achieved with a higher probability.

Further, in another aspect of the system of the present invention:

the first electrical load device is a household electrical load; and the second electrical load device is a charge/discharge device, which is used to charge a vehicle-mounted storage battery for driving a vehicle.

With this configuration, "the power consumption behavior of charging the vehicle-mounted storage battery", which has the high power consumption, can be easily guided to be occurred in a desired time slot. As a result, much of an amount of power consumption in one time slot can be shifted to another time slot more reliably, and hence the leveling of the amount of power consumption can be achieved with a higher probability.

Further, in another aspect of the system of the present invention, the fee setting unit is configured to set the first power fee unit price at a value common to a predetermined geographical area including a plurality of residences, and to set the second power fee unit price for each single transformer, which is installed in the power supply system for the predetermined geographical area to supply two or more residences of the plurality of residences with electric power.

With this configuration, the second power fee unit price can be set for each single transformer, and hence a sum total of amounts of electric power supplied to residences of two or more consumers through the single transformer (hereinafter also referred to as "total amount of system received power") can be leveled for each transformer.

In this case, it is preferred that the fee setting unit be configured to determine "a discount rate for (with respect to) the first power fee unit price" for setting the second power fee unit price, and be configured to set the second power fee unit price on the basis of the determined discount rate and the first power fee unit price.

With this configuration, the second power fee unit price can be set easily while preventing the second power fee unit price from exceeding the first power fee unit price.

Further, in another aspect of the system of the present invention, the fee setting unit is configured to:

acquire, for the each time slot, "a predicted load factor being a value obtained by dividing a predicted value of a total amount of system received power, which is a sum total of amounts of electric power supplied from the single transformer to the two or more residences connected to the single transformer, by a value obtained by converting a rated capacity of the single transformer into a corresponding amount of electric power"; and set the second power fee unit price so that the second power fee unit price in a time slot in which the predicted load factor is a first load factor is lower than the second power fee unit price in a time slot in which the predicted load factor is a second load factor which is larger than the first load factor.

With this configuration, a value set for the second power fee unit price becomes lower as the load factor of the transformer which is predicted (predicted load factor) becomes higher, and hence the power consumption behavior using the second electrical load device (for example, charging of the vehicle-mounted storage battery) can be easily guided from "a time slot in which the predicted load factor is higher" to "a time slot in which the predicted load factor is lower". As a result, the electric power can be supplied from the power supply system to the residences of the plurality of consumers (residences to which the electric power is supplied from the single transformer) so as not to exceed the rated capacity of the single transformer. Therefore, as an additional effect, the necessity for changing to a transformer having a larger rated capacity is reduced, and hence the cost regarding an investment for facilities accompanying the change of the transformer can be reduced.

Further, in another aspect of the system of the present invention, the fee setting unit is configured to set, by predicting a total amount of excess solar-generated power for the each time slot, the second power fee unit price in such a manner that the second power fee unit price becomes lower as the predicted total amount of excess solar-generated power for the each time slot becomes larger.

The total amount of excess solar-generated power for the each time slot is a difference between a value of a total amount of solar-generated power, which is "a sum total of amounts of electric power generated by solar power generation devices of the two or more residences connected to the single transformer", for the each time slot, and a value of a total amount of power consumption, which is "a sum total of amounts of power consumption of the two or more residences connected to the single transformer", for the each time slot.

With this configuration, the consumer can be prompted/urged to perform the power consumption behavior using the second electrical load device (for example, charging of the vehicle-mounted storage battery) so as to consume more of "the amount of excess solar-generated power", which is different for each transformer. As a result, the electric power generated through the solar power generation can be consumed without being wasted.

Further, in another aspect of the present invention, the fee setting unit is configured to:

vary the second power fee unit price for the single transformer in a range from a predetermined lower limit value (for example, 0 yen) to the first power fee unit price; and set, by predicting a total amount of excess solar-generated power for the each time slot, the second power fee unit price at the lower limit value when the predicted total amount of excess solar-generated power for the each time slot is equal to or more than an amount of reverse flow suppression threshold power, which is determined on the basis of a rated capacity of the single transformer.

When the total amount of excess solar-generated power is redundant, an amount of reverse flow power is excessive, and the electric power transmitted through the power supply system is unstable. Therefore, in general, power generation by a solar power generation device is suppressed so as to suppress the reverse flow power. As a result, the solar power generation device stops such power generation even with a capacity for further power generation.

In order to address this problem, as in the above-mentioned aspect, when the predicted total amount of excess solar-generated power for the each time slot is equal to or more than "the amount of reverse flow suppression threshold power, which is determined on the basis of the rated capacity of the single transformer", the second power fee unit price may be set to the lower limit value so that there is an increased possibility for the consumer to perform the power consumption behavior using the second electrical load device (for example, the charging of the vehicle-mounted storage battery). Therefore, the total amount of excess solar-generated power can be prevented from exceeding the amount of reverse flow suppression threshold power. As a result, the power generation by the solar power generation device is not suppressed so that the power generation capacity of the solar power generation device can be effectively utilized, and further, the consumer can obtain inexpensive electrical energy in place of, for example, gasoline.

Other objects, other features, and accompanying advantages of the present invention are easily understandable from the description of the embodiments of the present invention to be given with reference to the following drawings. Further, it is to be understood that the present invention also encompasses a method used in the system of the present invention.

BRIEF DESCRIPTION OF DRAWINGS

FIG. 6 is a table for showing an example of a total amount of power consumption for each time slot.

Figure 1:
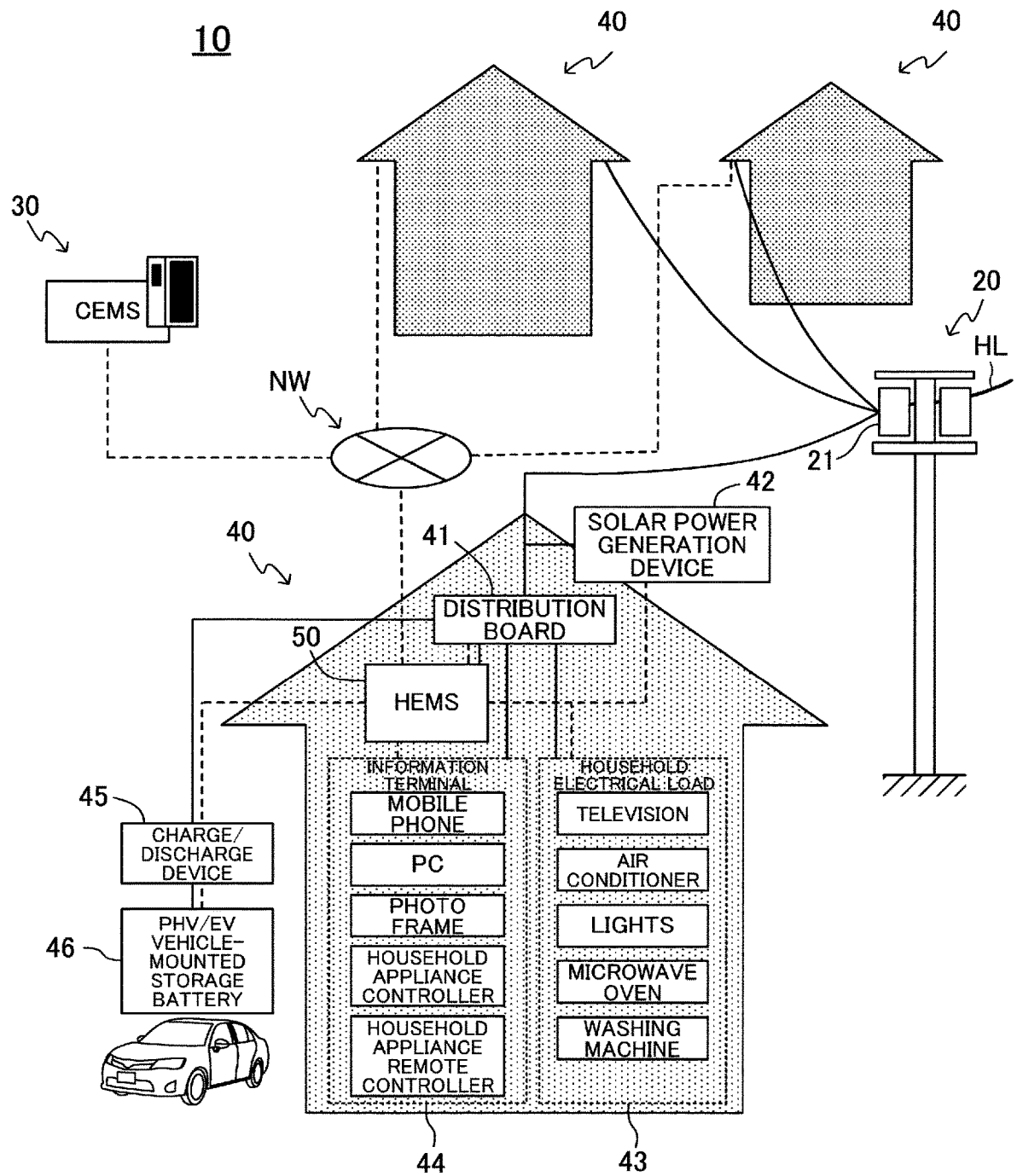
FIG. 1 is a schematic block diagram of a power supply management system according to an embodiment of the present invention.

DESCRIPTION OF EMBODIMENTS (Configuration of System)
In FIG. 1, a schematic configuration of a power supply management system (hereinafter also referred to as "this system") 10 according to an embodiment of the present invention is illustrated. This system 10 also serves as a power fee-related information provision system configured to notify a consumer of information on a power fee unit price. This system 10 includes a commercial power supply system 20, a community energy management system (CEMS) 30, and residences 40 of a plurality of consumers (individual users of electric power). In FIG. 1, the solid line indicates an electric power line, and the broken line indicates a data communication line.

The commercial power supply/source system (power supply system) 20 is a system configured to transmit electric power generated in a power plant (for example, thermal power plant) of an electric power supplier (electric power company) to "the residences 40 and unillustrated user facilities, such as an office)". The commercial power supply system 20 includes a pole transformer (hereinafter referred to as "transformer") 21 connected to a high-voltage power distribution line HL. The high-voltage power distribution line HL is connected to "a distributing substation, to which the electric power from the power plant is transmitted", and a high voltage (for example, 6,600 V) is applied to the high-voltage power distribution line HL. The transformer 21 is configured to change (transform) the high voltage into a voltage that may be used in the residences 40, the office, and the like (for example, 100 V). One transformer 21 is generally connected to a plurality of (that is, two or more) residences 40, and the electric power is supplied to the plurality of residences 40 through the one transformer 21.

The CEMS 30 is an energy management system configured to manage supply of electric power supplied from the power plant to a geographical area to be managed, an amount of electric power generated by solar power generation devices owned by consumers in the geographical area to be managed, an amount of power consumption (electric power demand) in the geographical area to be managed, and the like. The CEMS 30 includes a computer (arithmetic processing unit) and a data storage device.

The residence 40 includes a distribution board 41, a solar power generation device 42, a household electrical load 43, an information terminal 44, a charge/discharge device 45, a HEMS 50, and other such devices.

The distribution board 41 is connected to the transformer 21 and the solar power generation device 42 to receive the electric power from the commercial power supply system 20 through the transformer 21, and to receive electric power generated by the solar power generation device 42 from the solar power generation device 42. Further, the distribution board 41 is connected to the household electrical load 43, the information terminal 44, the charge/discharge device 45, and other such devices to distribute the electric power to those devices.

The solar power generation device 42 is a device configured to generate power using sunlight, and includes a solar panel and a power controller, both of which are not shown. The solar power generation device 42 is also connected to the transformer 21 to be able to supply the electric power generated by the solar power generation device 42 to the commercial power supply system 20 through the transformer 21. The power controller of the solar power generation device 42 is configured to be able to adjust the electric power generated by the solar panel.

The household electrical load 43 is generally an electrical load used in a house of the residence 40, and includes a television, an air conditioner, lights, a microwave oven, a washing machine, and other such household appliances. The household electrical load 43 is also conveniently referred to as "first electrical load device".

The information terminal 44 includes a mobile phone, a personal computer (PC) including a display, a photo frame, controllers for the household appliances, remote controllers for the household appliances, and the like. When the information terminal 44 consumes electric power, the information terminal 44 is treated as the household electrical load 43.

The charge/discharge device 45 is a device configured to charge "a battery configured to drive a vehicle (hereinafter also simply referred to as "vehicle-mounted storage battery") 46" mounted in the PHV/EV of the consumer. Further, the charge/discharge device 45 may supply electric power from the vehicle-mounted storage battery 46 to the household electrical load 43 through the distribution board 41. The charge/discharge device 45 is installed outdoors adjacent to the house of the residence 40. The charge/discharge device 45 is also conveniently referred to as "second electrical load device". Power consumption (kW) of the charge/discharge device 45 (second electrical load device) when charging the vehicle-mounted storage battery 46 is extremely higher than power consumption (kW) of the household electrical load 43 (first electrical load device). Therefore, an amount of power consumption (kWh) of the charge/discharge device 45 is extremely larger than an amount of power consumption (kWh) of the household electrical load 43.

The home energy management system (HEMS) 50 includes a computer (arithmetic processing unit), a data storage device, a display, and other such components. The HEMS 50 is connected to the distribution board 41, the power controller of the solar power generation device 42, the household electrical load 43, the information terminal 44, the charge/discharge device 45, and other such devices so as to be able to communicate (wirelessly and/or via wire) to/from those devices, and is configured to receive information from those devices, and to transmit information including control signals to those devices.

Further, the HEMS 50 is connected to the CEMS 30 via a network NW so as to be able to communicate to/from the CEMS 30, and is configured to transmit information to the CEMS 30, and to receive information from the CEMS 30.

(Outline of Setting of Power Fee Unit Price)

This system 10 has various objects, but main objects thereof include:

(1) Leveling electric power of each transformer 21 (electric power supplied from a single transformer 21 to the residence 40) to a value in the vicinity of a predetermined value that is equal to or less than a rated capacity (for example, 20 kVA to 30 kVA) of the transformer 21 (avoiding facility investment for increasing the rated capacity of the transformer);

(2) Reducing the cost regarding the use of the energy by the consumer; and (3) Effectively utilizing the solar power generation device.

In order to achieve the above-mentioned objects, this system 10 sets a power fee unit price (for example, an electricity fee for 1 kWh) on the basis of the following concepts.

The above-mentioned object (1) may be achieved by guiding a power consumption behavior of the consumer so that a load factor of the transformer 21, which is to be described later, is stably maintained at "as large a value as possible", which is less than 100%.

The above-mentioned objects (2) and (3) may be achieved by guiding the power consumption behavior of the consumer so that the electric power generated by the solar power generation device 42 is used without being wasted, and so that the power generation by the solar power generation device 42 is not restricted.

Therefore, depending on the situation, this system 10 sets "a power fee unit price in a case of using the charge/discharge device 45 to charge the vehicle-mounted storage battery 46 of the PHV/EV" at a value that is equal to or less than "a power fee unit price in a case of using the household electrical load 43". This is because the amount of power consumption of the charge/discharge device 45 when charging the vehicle-mounted storage battery 46 is significantly larger than the amount of power consumption of the individual household electrical loads 43. Therefore, when the power consumption behavior of using the charge/discharge device 45 to charge the vehicle-mounted storage battery 46 may be guided to an appropriate time slot, the above-mentioned objects may be achieved more easily.

Now, meanings of main terms used in the following description are described.

First power fee unit price: The power fee unit price in the case of using the household electrical load 43 (unit: yen/kWh). In this embodiment, the first power fee unit price is set to a value equal to a power fee unit price for each time slot provided by the electric power supplier. The power fee unit price for each time slot provided by the electric power supplier is also referred to as "real time pricing (RTP) unit price", and is set for every predetermined time period (in this embodiment, 30 minutes). The first power fee unit price is set by the electric power supplier depending on the balance between the amount of electric power generated by the power plant and the amount of power consumption in the geographical area to which the electric power is supplied from the power plant. More specifically, a value set for the first power fee unit price generally becomes higher as the predicted amount of power consumption in the geographical area approaches the predicted amount of electric power generated by the power plant.

Second power fee unit price: The power fee unit price in the case of using the charge/discharge device 45 to charge the vehicle-mounted storage battery 46 (unit: yen/kWh). This system 10 sets the second power fee unit price to a unit price that is equal to or less than the first power fee unit price.

In this specification, when "total" is prefixed to a particular amount of electric power, the amount of electric power indicates a sum total (total value) for a plurality of residences (consumers) that transmit and receive the electric power through "the single transformer 21". In other words, for example, "an amount of AA electric power" means an amount of AA electric power of each residence, and "a total amount of AA electric power" means a sum total (total value) of amounts of AA electric power of the plurality of residences connected to the single transformer 21.

Amount of solar-generated power: An amount of electric power generated by the solar power generation device 42 (unit: kWh). The amount of solar-generated power is also referred to as an amount of photovoltaic (pv) power.

Amount of power consumption: An amount of electric power consumed in the residence 40 (amount of electric power consumed by the household electrical load 43 and the charge/discharge device 45) (unit: kWh).

Amount of system received power: An amount of electric power supplied from the transformer 21 to the residence 40 (that is, drawn in by the residence 40) (unit: kWh). The amount of system received power is also referred to as "system received power amount".

Load factor: The load factor of the transformer 21 (value obtained by dividing the electric power supplied from the transformer 21 to the residences 40 by the rated capacity of the transformer 21). In this example, the load factor is calculated by dividing a total amount of system received power by a product of the rated capacity of the single transformer 21 corresponding to the total amount of system received power and one hour (hereinafter also referred to as "rated capacity corresponding value").

Amount of excess solar-generated power: A value obtained by subtracting the amount of power consumption from the amount of solar-generated power (unit: kWh).

Amount of PHV charging power: An amount of electric power consumed by the charge/discharge device 45 when charging the vehicle-mounted storage battery 46 of the PHV/EV (unit: kWh).

Figure 2:
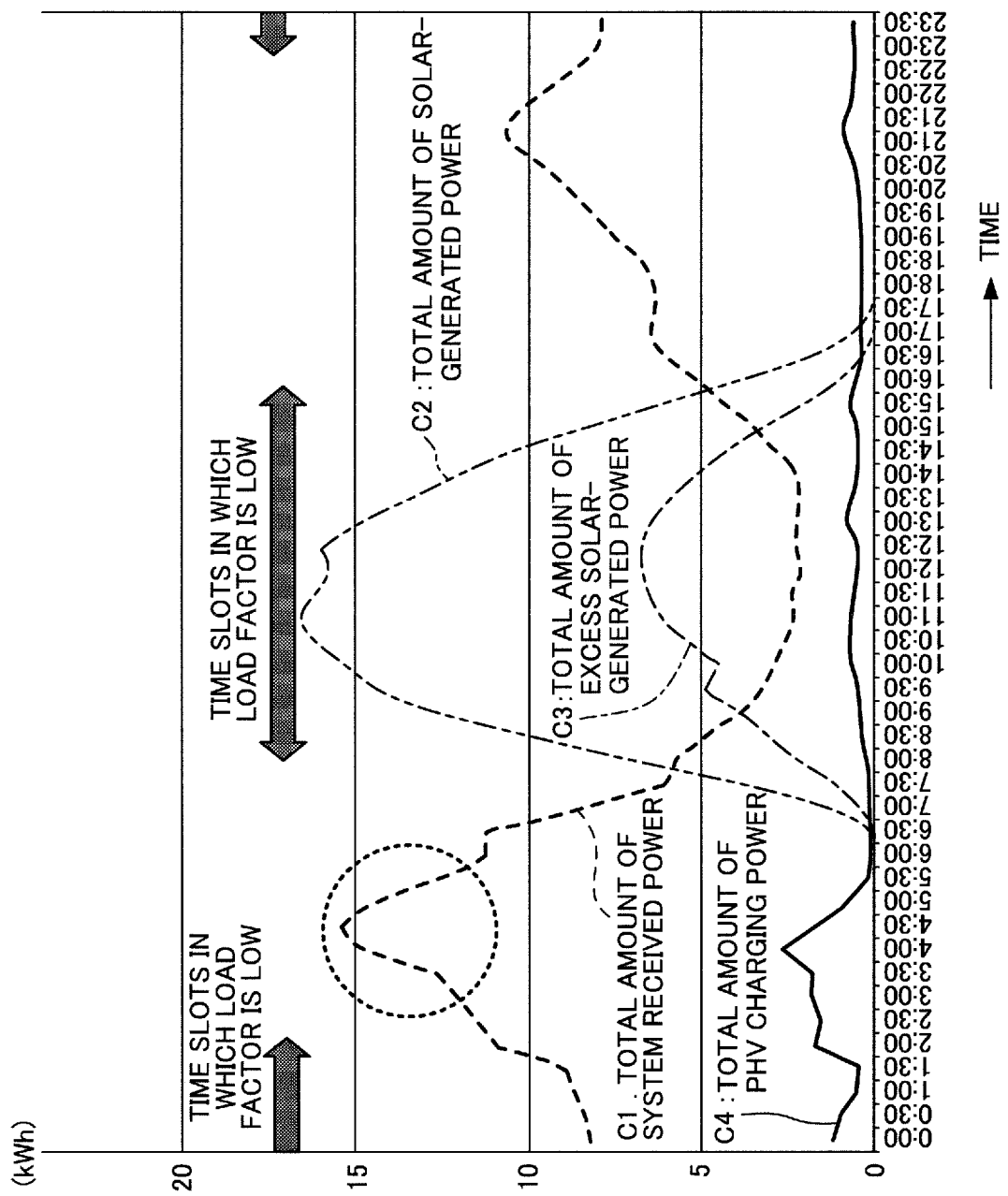
FIG. 2 is a graph for showing transitions of various amounts of electric power with time.

FIG. 2 is a graph showing various amounts of electric power regarding a single transformer 21. As indicated by a curve C4 of FIG. 2, many of the consumers for the transformer 21 often charge the vehicle-mounted storage batteries 46 in late-night time slots (for example, 2:00 to 5:00) in which PHVs/EVs are not used (driven). Further, the consumers often use the household electrical loads 43 in the early morning. As a result, as indicated by a curve C1, the total amount of system received power in late-night to early morning time slots (2:00 to 6:00) is very large.

Further, the consumers using the transformer 21 use the household electrical loads 43 relatively often in morning time slots (for example, 6:00 to 9:00) and in evening to late-night time slots (for example, 16:00 to 1:30). As a result, the total amount of system received power is relatively large in those time slots. In other words, in daytime time slots (9:00 to 16:00), the household electrical loads 43 are not used very much and the vehicle-mounted storage batteries 46 are rarely charged, and hence the total amount of system received power is relatively small.

Meanwhile, the solar panel of the solar power generation device 42 is irradiated with sunlight in morning to evening time slots (7:00 to 18:00). Therefore, as indicated by a curve C2, a total amount of solar-generated power is large in those time slots. As a result, as indicated by a curve C3, a total amount of excess solar-generated power is very large especially in time slots around noon (10:00 to 14:00). Therefore, in those time slots, excess power of the electric power generated by the solar power generation device 42 is supplied (flows reversely) to the commercial power supply system 20.

Figure 3:
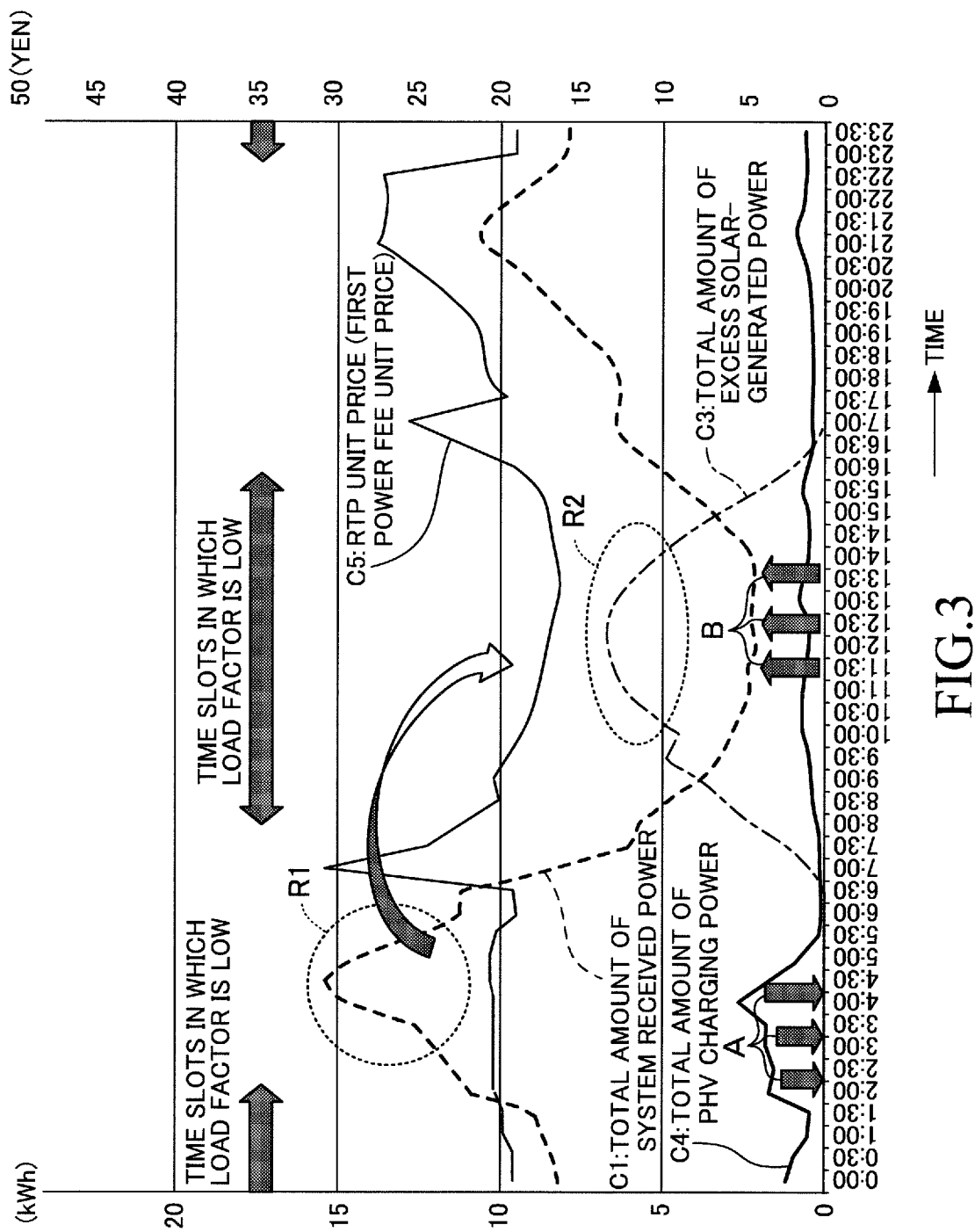
FIG. 3 is a graph for showing transitions of various amounts of electric power with time.

FIG. 3 is a graph showing the curves C1, C3, and C4 shown in FIG. 2, and an example of an RTP unit price (curve C5) as the first power fee unit price. As can be seen from FIG. 3, the RTP unit price in this example is relatively low from 0:00 a.m. to early morning (0:00 to 6:30), but is very high in morning time slots (6:30 to 8:30). Further, the RTP unit price is the lowest in daytime time slots (8:30 to 16:00) in one whole day, and is relatively high in evening to late-night time slots (16:00 to 0:00).

Incidentally, as described above, even when the power consumption behavior of each consumer is guided so that the household electrical loads 43 are used more in target time slots, the amount of power consumption of the individual household electrical loads 43 is small, and hence a significant movement in time of the total amount of power consumption cannot be expected. In contrast, the amount of power consumption of the charge/discharge device 45 when charging the vehicle-mounted storage battery 46 is very large, and hence when the power consumption behavior of each consumer is guided so that the charge/discharge device 45 is used to charge the vehicle-mounted storage battery 46 in the target time slots, a significant movement in time of the total amount of power consumption may be achieved.

To describe more specifically, in FIG. 3, if "a part (portion) of the total amount of system received power, the part being enclosed by a broken line circle R1", which is a part indicating that the total amount of system received power is excessive, is moved to time slots (daytime time slots) with a low total amount of system received power, the leveling of the load factor of the transformer 21 may be achieved, and the necessity for the facility investment for increasing the rated capacity of the transformer 21 may be reduced. Further, when the part of the total amount of system received power moved to the daytime time slots is covered by the amount of excess solar-generated power enclosed by an ellipse R2 in FIG. 3, the power generation capacity of the solar power generation device 42 can be effectively utilized.

In order for the electric power to be consumed as described above, it is effective to allow "the charging of the vehicle-mounted storage battery 46, which consumes a large amount of power and has a strong influence on the total amount of system received power" to be performed not in late-night time slots, in which the total amount of system received power (and hence load factor) is large, but in daytime time slots, in which the total amount of system received power (and hence load factor) is small and the total amount of excess solar-generated power is large, as indicated by arrows A and B.

Meanwhile, the consumer needs to charge the vehicle-mounted storage battery 46 in consideration of his/her plan to go out using the PHV/EV, and hence there is a constraint on time slots in which the vehicle-mounted storage battery 46 may be charged. Therefore, with only the setting of the RTP unit price and the notification to the consumer as in the related art, it is not easy to have the vehicle-mounted storage battery 46 charged in time slots with a high possibility of going out (for example, daytime time slots). Therefore, this system 10 sets, in the time slots in which the charging of the vehicle-mounted storage battery 46 is recommended, the second power fee unit price for the electric power used for the charging of the vehicle-mounted storage battery 46 to be lower than the first power fee unit price (in this example, RTP unit price).

(Specific Method of Setting Second Power Fee Unit Price)

On the basis of the above-mentioned concepts, this system 10 sets (determines) the second power fee unit price as follows.

1. Maximizing Load Factor of Transformer (Pole Transformer)

In order to achieve the above-mentioned object (1), this system 10 determines the second power fee unit price so as to stably maintain as large a value as possible in a range in which the load factor of the transformer 21 does not exceed 100% (=1), which is the upper limit value. Therefore, this system 10 sets the second power fee unit price at a smaller value as a predicted value of the load factor (predicted load factor) of the transformer 21 becomes smaller.

To describe more specifically, this system 10 determines a second power fee unit price (SP) on the basis of a first power fee unit price (FP) and a discount rate (DR) (that is, $SP=(1-DR) \cdot FP$). Therefore, this system 10 sets the discount rate DR at a larger value as the predicted value of the load factor of the transformer 21 becomes smaller. In other words, this system 10 determines the discount rate DR so that, as the predicted value of the load factor of the transformer 21 becomes larger, the discount rate DR becomes lower.

2. Management Based on Amount of Electric Power

Incidentally, this system 10 manages the electric power and provides information on the basis of "an amount of electric power (kWh)". Meanwhile, the rated capacity of the transformer 21 is expressed in terms of electric power (instantaneous value, unit: kVA=kW). Therefore, in order to prevent power of electricity flowing through the transformer 21 (that is, total system received power) from exceeding the rated capacity of the transformer 21 by managing (controlling) the total amount of system received power, there is a need to confirm that there is a strong correlation between the total amount of system received power and the system received power. Therefore, the inventors of the present invention have investigated a relationship therebetween. The results are shown in FIG. 4(A) and FIG. 4(B).

Figure 4:
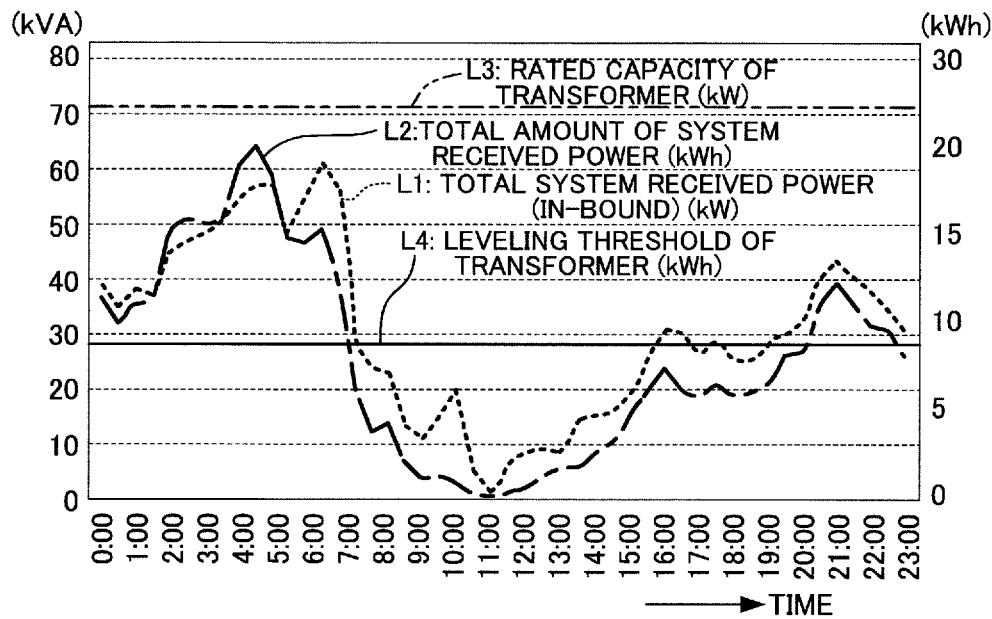
FIG. 4(A) is a graph for showing transitions of a total amount of system received power, total system received power, and the like with time.
FIG. 4(B) is a graph for showing a relationship between the total amount of system received power and the total system received power.
Figure 4:
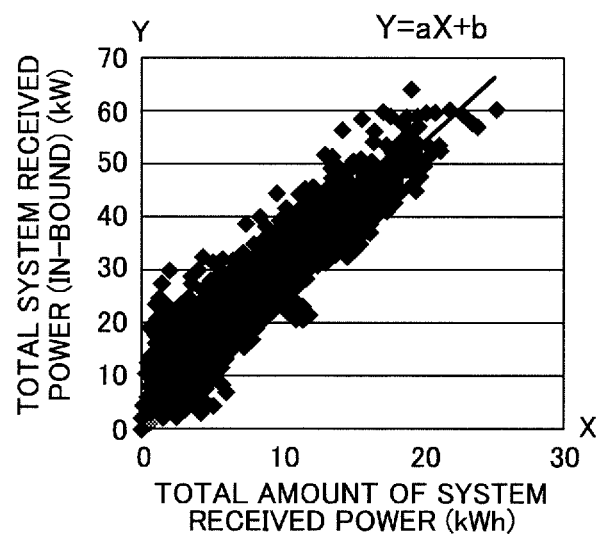

FIG. 4(A) is a graph showing changes in total system received power Y of the single transformer 21 (that is, total electric power drawn into the plurality of residences connected to the single transformer 21, IN-BOUND) and in total amount of system received power X (that is, a total amount of electric power drawn into the plurality of residences connected to the single transformer 21) for each time slot with the curves L1 and L2, respectively. FIG. 4(B) is a graph for showing a relationship between Y and X on the basis of the data shown in FIG. 4(A). As can be seen from FIG. 4(A) and FIG. 4(B), a substantially proportional relationship is established between the total system received power Y and the total amount of system received power X ($Y = a \cdot X + b$).

Therefore, when the total amount of system received power X is brought close to a value (leveling threshold Xth exemplified by the line L4 in FIG. 4(A)) obtained by subtracting a surplus from "the value corresponding to the total amount of system received power", which is determined from a rated capacity Yth of the transformer 21 and the above-mentioned proportional relationship, the total system received power Y may be "brought close to the rated capacity Yth of the transformer 21 in a range not exceeding the rated capacity Yth". In other words, when the total amount of system received power X may be stably maintained at a value close to the leveling threshold Xth, the load factor of the transformer 21 may be stably maintained at a value that is less than the upper limit value (100%) and is close to the upper limit value.

3. Utilization of Excess Solar-Generated Power and Suppression of Excessive Reverse Flow This system 10 achieves the above-mentioned object (2) by guiding the power consumption behavior of the consumer so that the excess power generated by the solar power generation device 42 is used to charge the vehicle-mounted storage battery 46. In other words, the power consumption behavior of the consumer is guided so that, instead of obtaining energy for driving the vehicle from gasoline, the excess power generated by the solar power generation device 42 is used as the energy for driving the vehicle. As a result, natural energy may be effectively utilized throughout society as a whole, and a heat source may be changed from gasoline to sunlight. Further, with the increased frequency of charging the vehicle-mounted storage battery 46 at the time when the power fee unit price (second power fee unit price) is low, the consumer may reduce the expense required for the energy for driving the vehicle.

Further, this system 10 effectively utilizes the solar power generation device 42 while suppressing the excessive reverse flow by guiding the power consumption behavior of the consumer so that the excess power generated by the solar power generation device 42 is used to charge the vehicle-mounted storage battery 46. The reverse flow is a flow of electricity caused when the excess power generated by the solar power generation device 42 of the consumer is returned to the commercial power supply system 20 through the transformer 21.

When an amount of electric power of the reverse flow is excessive, the operation of the commercial power supply system 20 becomes unstable. Therefore, in general, when a voltage on the output side of the transformer 21 is equal to or more than "a reverse flow suppression threshold voltage Vth determined on the basis of the rated capacity of the transformer 21" due to the reverse flow, the transformer 21 and/or the power controller of the solar power generation device 42 reduces the amount of power generated by the solar power generation device 42. The control to suppress the amount of power generated by the solar power generation device 42 is also referred to as "reverse flow suppression control". When the reverse flow suppression control is performed, a state in which the power generation capacity of the solar power generation device 42 is not fully utilized is generated, resulting in a situation in which otherwise usable electric power (solar energy) is not used.

Meanwhile, according to the study by the inventors of the present invention, it has been found that there is a certain relationship between the reverse flow suppression threshold voltage Vth and the total amount of excess solar-generated power at the time when the reverse flow suppression control is started. In other words, when the total amount of excess solar-generated power exceeds an amount of reverse flow suppression threshold power PVth, which is determined on the basis of the rated capacity of the transformer 21, the reverse flow suppression control is started.

Therefore, this system 10 sets the discount rate DR so that, when the total amount of excess solar-generated power exceeds "a preliminary threshold (PVth-D) determined on the basis of the amount of reverse flow suppression threshold power PVth", the discount rate DR is increased abruptly. With this configuration, this system 10 reduces the total amount of excess solar-generated power through the charging of the vehicle-mounted storage battery 46, to thereby avoid the reverse flow suppression control and effectively utilize both of the solar energy and the power generation capacity of the solar power generation device 42.

4. Specific Operation

Now, "specific operation of the computer of the CEMS 30 (hereinafter abbreviated as "CEMS") of this system 10" in accordance with the above-mentioned concepts of setting the power fee unit price is described. The CEMS manages the amount of electric power for each single transformer 21. Further, the management of the amount of electric power is performed with a unit of 30 minutes being one time frame (unit time width) in this example. In other words, a day (24 hours) is divided into 48 time frames (Time Frame 0 to Time Frame 47). It should be noted, however, that a unit of one time frame is not limited to 30 minutes, and may be 20 minutes or one hour, for example.

When a predetermined time (for example, every day at 20:30) arrives, the CEMS starts processing illustrated in a flow chart of FIG. 5 from Step 500, sequentially performs processing of Step 505 to Step 560, which are to be described below, and then proceeds to Step 595 to end this processing. In this example, the CEMS determines the second power fee unit price SP for a period of from today at 21:00 to tomorrow at 21:00 (hereinafter referred to as "prediction period").

Step 505: The CEMS predicts a total amount of solar-generated power PVWH in the prediction period for each of the units of a time frame (in units of 30 minutes). At this time, the CEMS predicts, on the basis of "information (for example, power generation capacity with respect to an amount of solar radiation) on the solar power generation devices 42 connected to the transformer 21 of interest", which is acquired in advance through the HEMS 50, and of weather forecast in the prediction period, the amounts of solar-generated power of the individual solar power generation devices 42 connected to the transformer 21 for each of the units of a time frame. Further, the CEMS sums the individual amounts of solar-generated power of the individual solar power generation devices 42 connected to the transformer 21 for each of the units of a time frame to predict the total amount of solar-generated power PVWH for each of the units of a time frame.

Step 510: The CEMS reads data of "total amounts of power consumption for each of the units of a time frame in the past" for the transformer 21 of interest from the data storage device, and predicts total amounts of power consumption CCWH in the prediction period for each of the units of a time frame based on the read data. For example, the CEMS selects days, each having weather similar to the predicted weather in the prediction period from among the past ten days, and averages "the total amounts of power consumption for each of the units of a time frame in the past" corresponding to the days to predict the total amounts of power consumption CCWH for each of the units of a time frame in the prediction period. An example of the predicted total amounts of power consumption CCWH is shown in FIG. 6. An amount of power consumption of each residence 40 is "an amount of electric power flowing through the distribution board 41 of each residence 40 from the upstream (the transformer 21 and the solar power generation device 42) to the downstream (the household electrical loads 43 and the charge/discharge device 45) of the distribution board 41", and data on the amount of electric power is transmitted from the HEMS 50 to the CEMS. The CEMS stores the transmitted data in the data storage device, for each day, for each of the units of a time frame, and for each consumer. The CEMS sums the transmitted data for each transformer 21 to store the total value as data of the total amount of power consumption in the data storage device for each day, for each of the units of a time frame, and for each transformer 21.

Step 515: The CEMS calculates (acquires) a total amount of system received power CRWH for each time frame in the prediction period in accordance with the following expression (1) (that is, by subtracting the total amount of solar-generated power PVWH from the total amount of power consumption CCWH). When the calculated total amount of system received power CRWH is a negative value, the CEMS sets the total amount of system received power CRWH to "0".

$$CRWH = CCWH - PVWH \quad (1)$$

Total amount of system received power CRWH
Total amount of power consumption CCWH
Total amount of solar-generated power PVWH Step 520: The CEMS calculates (acquires) the predicted value of the load factor (predicted load factor LF) of the transformer 21 for each time frame in the prediction period by applying the total amount of system received power CRWH and a rated capacity RC to the following expression (2). The denominator of the right side of the expression (2) is the above-mentioned rated capacity corresponding value.

$$LF = CRWH/(RC \cdot 1 \text{ hour}) \quad (2)$$

Predicted load factor LF
Total amount of system received power CRWH
Rated capacity RC Step 525: The CEMS acquires a solar power generation excess ratio PVRR for each time frame in the prediction period through calculation by applying the total amount of solar-generated power PVWH and the total amount of power consumption CCWH to the following expression (3). The numerator (PVWH−CCWH) of the right side of the following expression (3) is the total amount of excess solar-generated power. When the total amount of excess solar-generated power (PVWH−CCWH) is a negative value (that is, when the solar power generation excess ratio PVRR is a negative value), the CEMS sets the solar power generation excess ratio PVRR to "0".

$$PVRR = (PVWH - CCWH)/PVWH \quad (3)$$

Solar power generation excess ratio PVRR
Total amount of power consumption CCWH
Total amount of solar-generated power PVWH Step 530: The CEMS calculates (acquires) a solar power generation suppression index value PVSI for each time frame in the prediction period by applying the total amount of solar-generated power PVWH, the total amount of power consumption CCWH, and an amount of reverse flow suppression threshold power PVth to the following expression (4).

$$PVSI = (PVWH - CCWH)/PVth \quad (4)$$

Solar power generation suppression index value PVSI
Total amount of solar-generated power PVWH
Total amount of power consumption CCWH Amount of reverse flow suppression threshold power (solar power generation suppression value) PVth The numerator (PVWH−CCWH) of the right side of the above expression (4) is the total amount of excess solar-generated power. Further, the amount of reverse flow suppression threshold power PVth in the above expression (4) is a value determined on the basis of the rated capacity RC of the transformer 21 of interest. When the total amount of excess solar-generated power (PVWH−CCWH) is equal to or more than the amount of reverse flow suppression threshold power PVth, the above-mentioned reverse flow suppression control is started, with the result that the amount of electric power generated by the solar power generation device 42 is reduced. The amount of reverse flow suppression threshold power PVth is set in advance to be a larger value as the rated capacity RC becomes larger. When the total amount of excess solar-generated power (PVWH−CCWH) is a negative value (that is, when the solar power generation suppression index value PVSI is a negative value), the CEMS sets the amount of excess solar-generated power (PVWH−CCWH) to "0", and sets the solar power generation suppression index value PVSI to "0".

Step 535: The CEMS acquires a basic discount rate A for each time frame in the prediction period by applying the predicted load factor LF for each time frame, which has been determined in Step 520, to a look-up table MapA (LF). According to the table MapA (LF), the basic discount rate A is determined to be such value as described below (see the graph in a block B4 of FIG. 5).

The basic discount rate A is a value of 0 or more and 1 or less.

The basic discount rate A is gradually reduced toward "0" as the predicted load factor LF approaches "1" (that is, is increased toward "1").

The basic discount rate A is "0" when the predicted load factor LF is "1" (or a value LFa that is smaller than "1" by a predetermined value) or more.

Step 540: The CEMS acquires a first supplementary discount rate a for each time frame in the prediction period by applying the solar power generation excess ratio PVRR for each time frame, which has been determined in Step 525, to a look-up table Mapα (PVRR). According to the table Mapα (PVRR), the first supplementary discount rate α is determined as such value as described below (see the graph in a block B5 of FIG. 5).

The first supplementary discount rate α is a value of 0 or more.

The first supplementary discount rate α is gradually increased as the solar power generation excess ratio PVRR approaches "1" (that is, is increased toward "1").

Step 545: The CEMS acquires a second supplementary discount rate β for each time frame in the prediction period by applying the solar power generation suppression index value PVSI for each time frame, which has been determined in Step 530, to a look-up table Mapβ (PVSI). According to the table Mapβ (PVSI), the second supplementary discount rate β is determined as such value as described below (see the graph in a block B6 of FIG. 5).

The second supplementary discount rate β is a value of 0 or more.

The second supplementary discount rate β is gradually increased at a first increasing rate as the solar power generation suppression index value PVSI is increased from "0" toward a preliminary reverse flow suppression ratio Zth. The first increasing rate may be "0". In other words, when the solar power generation suppression index value PVSI is "0" or more and is less than the preliminary reverse flow suppression ratio Zth, the second supplementary discount rate β may be "0".

As the solar power generation suppression index value PVSI is increased from the preliminary reverse flow suppression ratio Zth toward "1", the second supplementary discount rate β is increased abruptly at a second increasing rate, which is higher than the first increasing rate, immediately after exceeding the preliminary reverse flow suppression ratio Zth, and then is gradually increased up to a value: $((1/A)-1)=(1-A)/A$. As the solar power generation suppression index value PVSI is increased from the preliminary reverse flow suppression ratio Zth toward "1", the second supplementary discount rate β may be increased at a certain increasing rate, which is larger than the first increasing rate, up to the value: $((1/A)-1)=(1-A)/A$. When the solar power generation suppression index value PVSI is "1", the second supplementary discount rate β is the value $((1/A)-1)$. The preliminary reverse flow suppression ratio Zth is determined by applying the above-mentioned amount of reverse flow suppression threshold power PVth and a predetermined positive value D to the following expression (5).

$$Zth=(PVth-D)/PVth \quad (5)$$

Preliminary reverse flow suppression ratio Zth
Amount of reverse flow suppression threshold power PVth
Predetermined positive value D Step 550: The CEMS calculates (acquires) the discount rate DR for each time frame in the prediction period by applying the basic discount rate A for each time frame, which has been acquired in Step 535, the first supplementary discount rate α for each time frame, which has been acquired in Step 540, and the second supplementary discount rate β for each time frame, which has been acquired in Step 545, to the following expression (6). When the calculated discount rate DR is higher than "1", the CEMS sets the discount rate DR to "1".

$$DR=A\cdot(1+\alpha)\cdot(1+\beta) \quad (6)$$

Discount rate DR
Basic discount rate A
First supplementary discount rate α
Second supplementary discount rate β

As described above, when the solar power generation suppression index value PVSI is "1", the second supplementary discount rate β is the value $((1/A)-1)$. Therefore, when the solar power generation suppression index value PVSI is "1", the discount rate DR is a value $(1+\alpha)$ from the above-mentioned expression (6). Therefore, when the solar power generation suppression index value PVSI is a value of "1" or more (in other words, when the total amount of excess solar-generated power (PVWH−CCWH) is the amount of reverse flow suppression threshold power PVth or more), the discount rate DR is "1". As a result, as can be seen from the expression (7), which is to be described later, the second power fee unit price SP is "0 (yen)" (that is, the lower limit value of a fluctuation range of the second power fee unit price SP).

Step 555: The CEMS calculates (acquires) the second power fee unit price SP for each time frame in the prediction period by applying the first power fee unit price FP for each time frame and the discount rate DR for each time frame, which has been acquired in Step 550, to the following expression (7). As described above, in this example, the first power fee unit price FP is set at the value that is equal to the RTP unit price.

$$SP=FP\cdot(1-DR) \quad (7)$$

Second power fee unit price SP
First power fee unit price FP
Discount rate DR

Step 560: The CEMS displays, through the HEMS 50 of the residences 40 (consumers) connected to the transformer 21 of interest, the first power fee unit price FP and the second power fee unit price SP for each time frame in the prediction period on a PC and/or a photo frame of the residence 40. At this time, the CEMS clearly specifies that the second power fee unit price is "a price in the case of using the charge/discharge device 45 to charge the vehicle-mounted storage battery 46 of the PHV/EV". The CEMS may display the discount rate DR in addition to the second power fee unit price SP or in place of the second power fee unit price SP, and may display in some cases such symbol (shape or color) that the discount rate is more highlighted as the discount rate increases.

Further, the CEMS may perform the following additional operation in Step 560.

The CEMS estimates power consumption of the consumer on the basis of the amounts of power consumption of the individual consumers (residences 40) in a time slot (time frame) in which the predicted load factor LF of the transformer 21 is less than a predetermined threshold load factor LFth.

When the estimated power consumption is equal to or more than a predetermined proportion of contracted electric power of the consumer (electric power the consumer contracts with the electric power supplier), the CEMS does not display the second power fee unit price, or sets the discount rate DR to "0" to set the second power fee unit price to a price that is equal to the first power fee unit price.

With this configuration, when the consumer uses the charge/discharge device 45 to charge the vehicle-mounted storage battery 46 by being guided by the display of the discounted second power fee unit price SP, it is possible to avoid the situation in which electric power exceeding the contracted electric power of the consumer is drawn into the residence 40 of the consumer.

Figure 5:
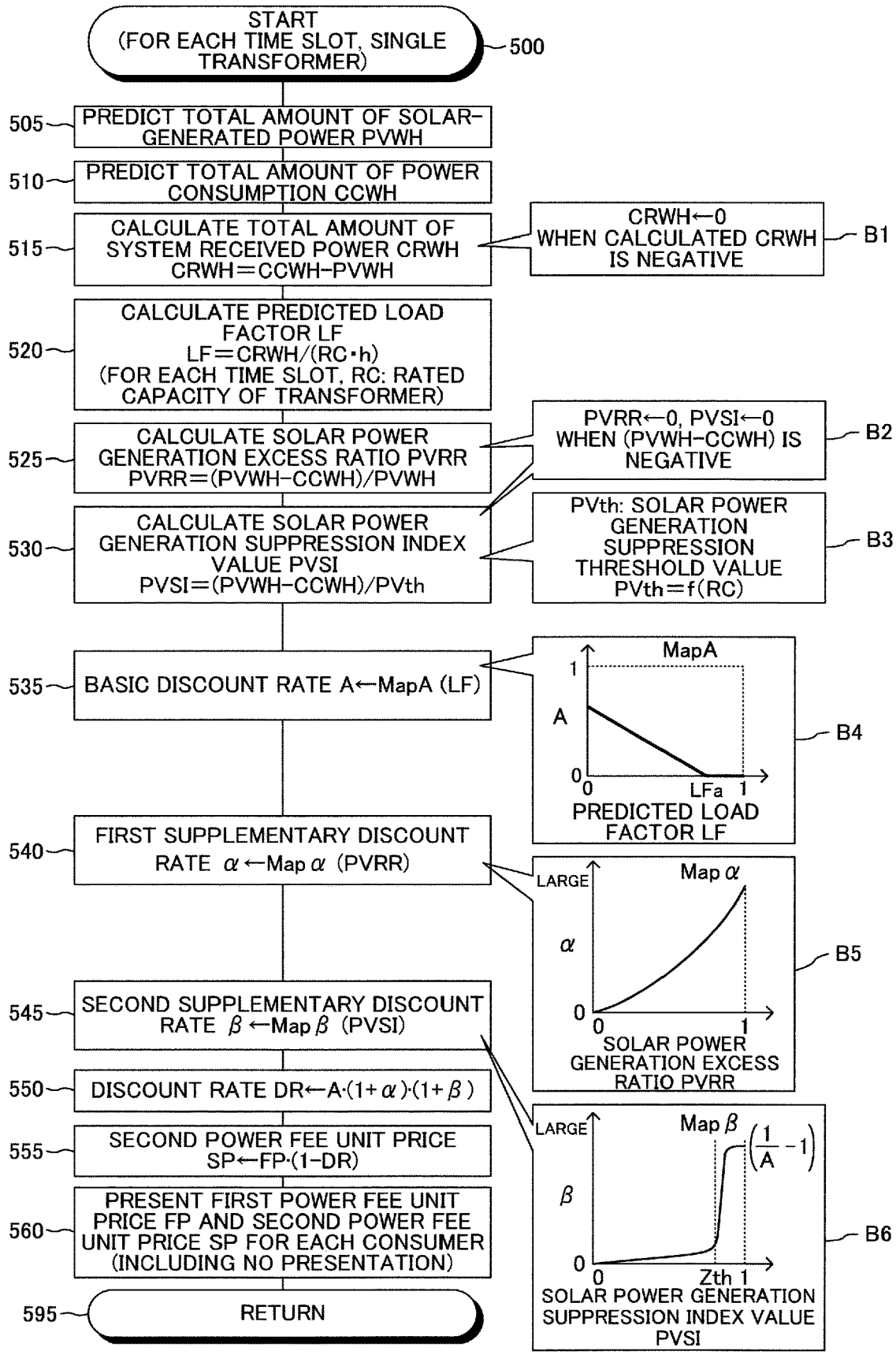
FIG. 5 is a flow chart for illustrating a routine executed by a CEMS illustrated in FIG. 1.

As described above, this system 10 includes:
a fee setting unit configured to set the power fee unit prices (first and second power fee unit prices) for each time slot (see the CEMS 30 and Step 505 to Step 555 of FIG. 5); and a notification unit configured to notify the consumer of information on the above-mentioned set power fee unit prices (see the CEMS 30, the PC, the photo frame, and Step 560 of FIG. 5).

In addition, the fee setting unit is configured to set the first power fee unit price FP, which is a power fee unit price for the first electrical load device (household electrical load 43), and the second power fee unit price SP, which is a power fee unit price for the second electrical load device (charge/discharge device 45), so that the first power fee unit price FP and the second power fee unit price SP are different from each other (see Step 555 of FIG. 5).

Further, the fee setting unit is configured to set the second power fee unit price SP at a value that is lower than the first power fee unit price FP (see Step 535 to Step 555 of FIG. 5).

Further, the fee setting unit is configured to set the first power fee unit price FP at a value common to a predetermined geographical area including a plurality of residences, and set the second power fee unit price SP for each single transformer 21, which is installed in the commercial power supply system (power supply system) 20 for the predetermined geographical area to supply two or more residences 40 of the plurality of residences with electric power (see each Step of FIG. 5).

Further, the fee setting unit is configured to determine "the discount rate DR for the first power fee unit price" to set/determine the second power fee unit price SP (see Step 505 to Step 550 of FIG. 5), and set the second power fee unit price SP on the basis of the determined discount rate DR and the first power fee unit price FP (see Step 555 of FIG. 5).

In addition, the fee setting unit is configured to:

acquire, for each time slot, "the predicted load factor LF, which is a value obtained by dividing the predicted value CRWH of the total amount of system received power, which is a sum total of amounts of electric power supplied from the single transformer 21 to the two or more residences 40 connected to the single transformer 21, by a value (RC·1 h) obtained by converting the rated capacity RC of the single transformer 21 into a corresponding amount of electric power" (see Step 520 of FIG. 5); and set the second power fee unit price so that the second power fee unit price SP in the time slot in which the predicted load factor LF is the first load factor becomes lower than the second power fee unit price SP in the time slot in which the predicted load factor LF is the second load factor, which is larger than the first load factor (see Step 535, the block B4, Step 550, and Step 555 of FIG. 5).

Further, the fee setting unit is configured to predict the total amount of excess solar-generated power (PVWH−CCWH) for each time slot, and set the second power fee unit price SP to become lower as the predicted total amount of excess solar-generated power for each time slot becomes larger (see Step 525, Step 540, the block B5, Step 550, and Step 555 of FIG. 5).

Further, the fee setting unit is configured to:

vary the second power fee unit price SP for the single transformer 21 in a range of a predetermined lower limit value (for example, "0 yen" when the discount rate DR=1) or more and the first power fee unit price FP or less ($0 \leq DR \leq 1$, see Step 535 to Step 555, and the block B4 to the block B6 of FIG. 5); and predict the total amount of excess solar-generated power (PVWH−CCWH) for each time slot, and when the predicted total amount of excess solar-generated power for each time slot is equal to or more than the amount of reverse flow suppression threshold power PVth, which is determined on the basis of the rated capacity RC of the single transformer 21, set the second power fee unit price SP at the above-mentioned lower limit value (discount rate DR=1) (see Step 545, β when PVSI=1 in the block B6, Step 550, and Step 555 of FIG. 5).

Therefore, this system 10 may guide the power consumption behavior of the consumer so that the charging of the vehicle-mounted storage battery 46 using the charge/discharge device 45 is performed in appropriate time slots (time slots in which the predicted load factor LF is small, time slots in which the total amount of excess solar-generated power (PVWH−CCWH) is large, and time slots with a high possibility that the reverse flow suppression control is executed). Therefore, this system 10 may achieve the above-mentioned objects (1) to (3) and other such objects.

The present invention is not limited to the above-mentioned embodiment, and may employ various modification examples within the scope of the present invention. For example, this system 10 may acquire "an average value and a standard deviation of the predicted load factors LF" in the prediction period through calculation, and provide the consumer with the second power fee unit price in Step 560 of FIG. 5 only when both of the following two conditions are satisfied. Alternatively, this system 10 may calculate the second power fee unit price SP in accordance with the routine illustrated in FIG. 5 and present the calculated second power fee unit price SP to the consumer only when both of the following two conditions are satisfied, and set the second power fee unit price SP at the value that is equal to the first power fee unit price FP and present the set second power fee unit price SP to the consumer (that is, set the discount rate DR at "0") when at least any one of the following two conditions is not satisfied.

(Condition 1) The average value of the predicted load factors LF is less than "the predetermined threshold load factor LFth determined on the basis of the rated capacity RC of the corresponding transformer 21 (for example, LFth=γ·RC·1 h, where γ is a predetermined constant of from 0 to 1, for example, 0.8)". In other words, the condition 1 is satisfied, if the power consumption behavior is guided to be performed in a time slot, there is no possibility that the total amount of system received power may be excessive, and hence there is no possibility that the system received power may exceed the rated capacity of the transformer 21 in the time slot.

(Condition 2) The standard deviation of the predicted load factors LF is equal to or more than a threshold standard deviation. In other words, a variation (fluctuation) in predicted load factor LF for each time slot is large.

Further, this system 10 may monitor, by the HEMS 50 and the CEMS 30, whether or not the vehicle-mounted storage battery 46 has been actually charged using the charge/discharge device 45 in time slots in which the second power fee unit price is low (time slots in which the discount rate DR is high), and may provide the consumer with incentive points when such charging has been performed. In this case, the consumer may use the incentive points for payment of merchandise or an electricity fee.

Further, this system 10 has determined the second power fee unit price SP using the discount rate DR, but may determine a discount DY itself and set, as the second power fee unit price SP, a value obtained by subtracting the discount DY from the first power fee unit price FP.

Further, this system 10 has acquired the first supplementary discount rate α on the basis of the solar power generation excess ratio PVRR and the look-up table Mapα(PVRR). However, this system 10 may acquire the first supplementary discount rate α on the basis of the total amount of excess solar-generated power (PVWH−CCWH) and the look-up table Mapα (PVWH−CCWH). According to this table Mapα (PVWH−CCWH) as well, the first supplementary discount rate α is determined so that, as the total amount of excess solar-generated power (PVWH−CCWH) becomes larger, the first supplementary discount rate α becomes higher.

Further, this system 10 has acquired the second supplementary discount rate β on the basis of the solar power generation suppression index value PVSI and the look-up table Mapβ (PVSI). However, this system 10 may acquire the second supplementary discount rate β on the basis of "a difference DF between the amount of reverse flow suppression threshold power PVth and the total amount of excess solar-generated power (PVWH−CCWH) (DF=PVth− (PVWH−CCWH))" and the look-up table Mapβ (DF). According to the table Mapβ (DF), the second supplementary discount rate β is determined so that, as the difference DF becomes smaller, the second supplementary discount rate β becomes higher.

Further, this system 10 has set the second power fee unit price SP for each transformer 21. However, this system 10 may set the second power fee unit price SP for each residence 40, and guide the power consumption behavior of each consumer to appropriate time slots.

Further, this system 10 corrects the basic discount rate A using both the first supplementary discount rate α and the second supplementary discount rate β, but may correct the basic discount rate A using only one of the first supplementary discount rate α and the second supplementary discount rate β. Alternatively, this system 10 may use the basic discount rate A itself as the final discount rate DR.

What is claimed is:

1. A power supply management system, which is configured to supply electric power from a power supply system to a first electrical load device used in a residence of a consumer and having power consumption of a first value, and to a second electrical load device used in the residence of the consumer and having power consumption of a second value which is different from the first value, the power supply management system comprising:
a processor configured to set a power fee unit price for each time slot; and
a display configured to notify the consumer of information on the set power fee unit price, wherein the processor is configured to:
set a first power fee unit price, which is the power fee unit price for the first electrical load device, and a second power fee unit price, which is the power fee unit price for the second electrical load device, in such a manner that the first power fee unit price and the second power fee unit price are different from each other;
set the first power fee unit price at a value common to a predetermined geographical area including a plurality of residences, and to set the second power fee unit price for each single transformer, which is installed in the power supply system for the predetermined geographical area to supply two or more residences of the plurality of residences with electric power;
acquire a predicted load factor for the each time slot; and
set the second power fee unit price such that the second power fee unit price in a first time slot in which the predicted load factor is a first load factor is lower than the second power fee unit price in a second time slot in which the predicted load factor is a second load factor which is larger than the first load factor;
wherein the predicted load factor is a value obtained through dividing a predicted value of a total amount of system received power, which is a sum total of amounts of electric power supplied from a single transformer to the two or more residences connected to the single transformer, by a value obtained by converting a rated capacity of the single transformer into a corresponding amount of electric power.

2. A power supply management system, which is configured to supply electric power from a power supply system to a first electrical load device used in a residence of a consumer and having power consumption of a first value, and to a second electrical load device used in the residence of the consumer and having power consumption of a second value which is different from the first value, the power supply management system comprising:
a processor configured to set a power fee unit price for each time slot; and
a display configured to notify the consumer of information on the set power fee unit price, wherein the processor is configured to:
set a first power fee unit price, which is the power fee unit price for the first electrical load device, and a second power fee unit price, which is the power fee unit price for the second electrical load device, in such a manner that the first power fee unit price and the second power fee unit price are different from each other;
set the first power fee unit price at a value common to a predetermined geographical area including a plurality of residences, and to set the second power fee unit price for each single transformer, which is installed in the power supply system for the predetermined geographical area to supply two or more residences of the plurality of residences with electric power;
predict a total amount of excess solar-generated power for the each time slot; and
set the second power fee unit price such that the second power fee unit becomes lower as the predicted total amount of excess solar-generated power for the each time slot becomes larger;
wherein the total amount of excess solar-generated power for the each time slot is a difference between a value of a total amount of solar-generated power which is a sum total of amounts of electric power generated by solar power generation devices of the two or more residences connected to a single transformer, for the each time slot, and a value of a total amount of power consumption which is a sum total of amounts of power consumption of the two or more residences connected to the single transformer, for the each time slot.

3. A power supply management system, which is configured to supply electric power from a power supply system to a first electrical load device used in a residence of a consumer and having power consumption of a first value, and to a second electrical load device used in the residence of the consumer and having power consumption of a second value which is different from the first value, the power supply management system comprising:
a processor configured to set a power fee unit price for each time slot; and
a display configured to notify the consumer of information on the set power fee unit price, wherein the processor is configured to:
set a first power fee unit price, which is the power fee unit price for the first electrical load device, and a second power fee unit price, which is the power fee unit price for the second electrical load device, in such a manner that the first power fee unit price and the second power fee unit price are different from each other;

set the first power fee unit price at a value common to a predetermined geographical area including a plurality of residences, and to set the second power fee unit price for each single transformer, which is installed in the power supply system for the predetermined geographical area to supply two or more residences of the plurality of residences with electric power;

vary the second power fee unit price for a single transformer in a range of a lower limit value or more and the first power fee unit price or less;

predict a total amount of excess solar-generated power for the each time slot; and set the second power fee unit price at the lower limit value when the predicted total amount of excess solar-generated power for the each time slot is equal to or more than an amount of reverse flow suppression threshold power which is determined on a basis of a rated capacity of the single transformer;

wherein the total amount of excess solar-generated power for the each time slot is a difference between a value of a total amount of solar-generated power which is a sum total of amounts of electric power generated by solar power generation devices of the two or more residences connected to the single transformer, for the each time slot, and a value of a total amount of power consumption which is a sum total of amounts of power consumption of the two or more residences connected to the single transformer, for the each time slot.

4. The power supply management system according to claim 2, wherein:

the second value is larger than the first value, and the processor is configured to set the second power fee unit price at a value that is lower than the first power fee unit price.

5. The power supply management system according to claim 2, wherein:

the second value is larger than the first value;

the processor is configured to set the second power fee unit price at a value that is lower than the first power fee unit price;

the first electrical load device comprises a household electrical load; and the second electrical load device comprises a charge/discharge device, which is used to charge a vehicle-mounted storage battery for driving a vehicle.

6. The power supply management system according to claim 2, wherein the processor is configured to determine a discount rate with respect to the first power fee unit price, the discount rate being used to set the second power fee unit price, and to set the second power fee unit price on a basis of the determined discount rate and the first power fee unit price.

7. The power supply management system according to claim 3, wherein:

the second value is larger than the first value, and the processor is configured to set the second power fee unit price at a value that is lower than the first power fee unit price.

8. The power supply management system according to claim 3, wherein:

the second value is larger than the first value;

the processor is configured to set the second power fee unit price at a value that is lower than the first power fee unit price;

the first electrical load device comprises a household electrical load; and the second electrical load device comprises a charge/discharge device, which is used to charge a vehicle-mounted storage battery for driving a vehicle.

9. The power supply management system according to claim 3, wherein the processor is configured to determine a discount rate with respect to the first power fee unit price, the discount rate being used to set the second power fee unit price, and to set the second power fee unit price on a basis of the determined discount rate and the first power fee unit price.

10. The power supply management system according to claim 4, wherein:

the second value is larger than the first value, and the processor is configured to set the second power fee unit price at a value that is lower than the first power fee unit price.

11. The power supply management system according to claim 4, wherein:

the second value is larger than the first value;

the processor is configured to set the second power fee unit price at a value that is lower than the first power fee unit price;

the first electrical load device comprises a household electrical load; and the second electrical load device comprises a charge/discharge device, which is used to charge a vehicle-mounted storage battery for driving a vehicle.

12. The power supply management system according to claim 4, wherein the processor is configured to determine a discount rate with respect to the first power fee unit price, the discount rate being used to set the second power fee unit price, and to set the second power fee unit price on a basis of the determined discount rate and the first power fee unit price.

* * * * *